United States Patent
Cicairos

(10) Patent No.: US 10,648,171 B1
(45) Date of Patent: May 12, 2020

(54) DIRT EXTRACTION APPARATUS FOR USE IN BUILDING CRAWLSPACES

(71) Applicant: Justin Alberto Cicairos, Sebastopol, CA (US)

(72) Inventor: Justin Alberto Cicairos, Sebastopol, CA (US)

( * ) Notice: Subject to any disclaimer, the term of this patent is extended or adjusted under 35 U.S.C. 154(b) by 383 days.

(21) Appl. No.: 15/852,590

(22) Filed: Dec. 22, 2017

Related U.S. Application Data

(60) Provisional application No. 62/437,990, filed on Dec. 22, 2016.

(51) Int. Cl.

| | | |
|---|---|---|
| *A47L 5/30* | (2006.01) | |
| *A01B 33/02* | (2006.01) | |
| *A47L 9/32* | (2006.01) | |
| *A47L 9/00* | (2006.01) | |
| *A47L 9/04* | (2006.01) | |
| *A01B 33/08* | (2006.01) | |
| *E04B 1/76* | (2006.01) | |

(52) U.S. Cl.
CPC .......... *E04B 1/7612* (2013.01); *A01B 33/028* (2013.01); *A01B 33/082* (2013.01); *A01B 33/087* (2013.01); *A47L 5/30* (2013.01); *A47L 9/009* (2013.01); *A47L 9/0466* (2013.01); *A47L 9/325* (2013.01)

(58) Field of Classification Search
CPC ........ A47L 9/0466; A47L 9/009; A47L 9/325; A47L 5/30; A01B 33/087; A01B 33/028; A01B 33/082; A01B 35/16; A01B 35/28
See application file for complete search history.

(56) References Cited

U.S. PATENT DOCUMENTS

| | | | | |
|---|---|---|---|---|
| 4,074,869 A * | 2/1978 | Johnson | ................ | A01G 3/002 |
| | | | | 15/339 |
| 5,375,399 A * | 12/1994 | Kraft | .................... | A01D 34/005 |
| | | | | 15/347 |
| 5,707,017 A * | 1/1998 | Paolucci | ................ | A01G 3/002 |
| | | | | 241/55 |
| 6,131,239 A * | 10/2000 | White | ....................... | A47L 5/24 |
| | | | | 15/352 |
| 7,329,297 B2 * | 2/2008 | Dunning | ............... | A47L 9/1608 |
| | | | | 55/385.1 |
| 7,475,528 B2 * | 1/2009 | Bishop | ................... | A01D 51/00 |
| | | | | 15/349 |
| 8,042,223 B2 * | 10/2011 | Freewalt | ................. | A01D 7/00 |
| | | | | 15/405 |
| 2014/0173946 A1 * | 6/2014 | Gerrits | ................ | B62D 11/001 |
| | | | | 37/248 |

* cited by examiner

*Primary Examiner* — David Redding
(74) *Attorney, Agent, or Firm* — Plager Schack LLP

(57) ABSTRACT

A dirt extraction apparatus for use by a user in a crawlspace of a building to extract dirt and debris is provided. The dirt extraction apparatus includes a housing having an internal conduit with an inlet and an outlet, a plurality of blades rotatably mounted to the housing proximate the inlet, a motor disposed within the housing and operably connected to the plurality of blades, a support handle coupled to the top face of the housing and having a plurality of bars coupled together, and a collection assembly coupled to the outlet of the housing. Any bar of the support handle is grabbed by the user to maneuver the apparatus within the building crawlspace, thereby enabling the rotating blades to evacuate the dirt and debris from the ground surface through the internal conduit of the housing to the collection assembly.

10 Claims, 4 Drawing Sheets

DIRT EXTRACTION APPARATUS FOR USE IN BUILDING CRAWLSPACES

RELATED APPLICATION

The application claims priority to provisional patent application U.S. Ser. No. 62/437,990 filed on Dec. 22, 2016, the entire contents of which is herein incorporated by reference.

BACKGROUND

The embodiments herein relate generally to devices and methods for cleaning building crawlspaces.

A crawlspace beneath a building typically comprises a concrete or brick foundation that elevates the building above the ground. This is especially important in locations with high termite populations and damp ground conditions. Crawlspaces also enhance air circulation throughout buildings and provide individuals with access to plumbing or electrical conduits to perform maintenance and repairs. The space in building crawlspaces typically varies within the approximate height range of 12"-24", which makes it difficult for individuals to reach and access items within the crawlspace.

Due to the limited space available, cleaning or removing dirt and debris from the building crawlspace is especially challenging. Homeowners and building contractors often rely on manual labor and tools such as shovels, boards and/or ropes to extract dirt and debris from the crawlspaces. This is inefficient and burdensome for the individuals. Professional crawlspace cleaning companies exist, but they are expensive and not practical for many individuals.

As such, there is a need in the industry for a dirt extraction apparatus for use in building crawlspaces that addresses the limitations of the prior art, which effectively extracts dirt and debris from building crawlspaces with enhanced efficiency. There is a further need for the dirt extraction apparatus to be a cost-effective solution that users can easily maneuver within the crawlspace.

SUMMARY

A dirt extraction apparatus for use by a user to operate on a ground surface in a crawlspace of a building to extract dirt and debris with enhanced efficiency is provided. The dirt extraction apparatus comprises a housing comprising a front face, a rear face opposite the front face, a pair of side faces connecting the front and rear faces together, a top face coupled to the pair of side faces, and a bottom face opposite the top face and coupled to the pair of side faces, the housing comprising an internal conduit with an inlet on the front face and an outlet on the rear face, a plurality of blades rotatably mounted to the exterior of the housing proximate the inlet, a motor disposed within the housing and operably connected to the plurality of blades, the motor configured to drive the plurality of blades, a support handle coupled to the top face of the housing and comprising a plurality of bars coupled together, and a collection assembly coupled to the outlet of the housing, wherein any one of the plurality of bars of the support handle is configured to be grabbed by the user to maneuver the dirt extraction apparatus within the crawlspace of the building, thereby enabling the plurality of rotating blades to facilitate an evacuation of the dirt and debris from the ground surface through the internal conduit of the housing to the collection assembly.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
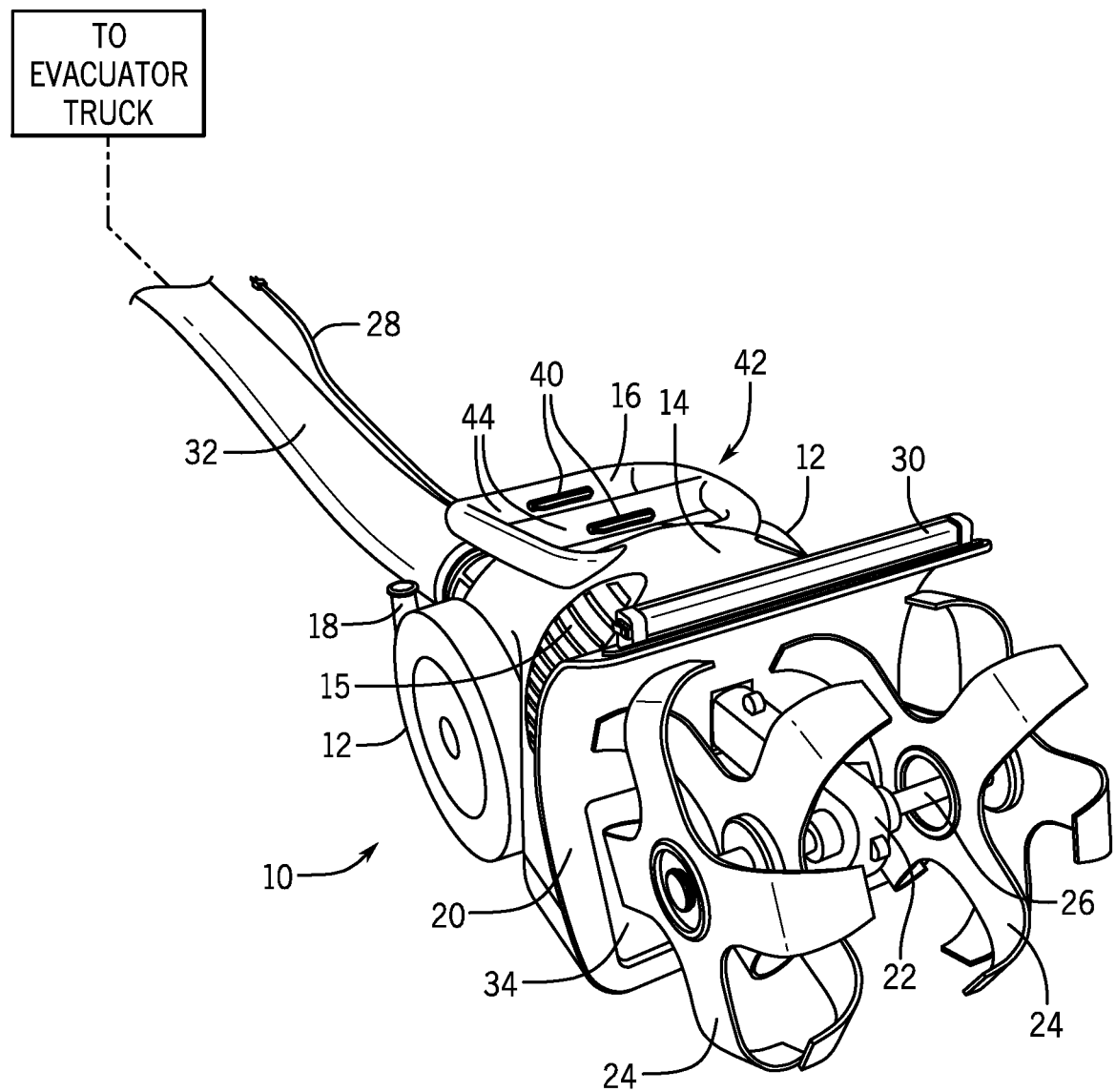
FIG. 1 depicts a perspective view of certain embodiments of the dirt extraction apparatus.

As depicted in FIGS. 1-4, dirt extraction apparatus 10 is configured to evacuate dirt and/or debris present in a crawlspace of a building to a collection assembly such as an evacuator truck for a disposal. Dirt extraction apparatus 10 is designed to be easily maneuvered by a user in and out of the limited space in a crawlspace to efficiently remove the dirt and/or debris. In certain embodiments, dirt extraction apparatus 10 generally comprises wheels 12, housing 14, top support handle 42, side handles 18, blades 24 and motor 36. In one embodiment, dirt extraction apparatus 10 comprises approximate dimensions of a 12" height, 14"-16" width and 20" length. However, dimensions of dirt extraction apparatus 10 may vary.

Figure 4:
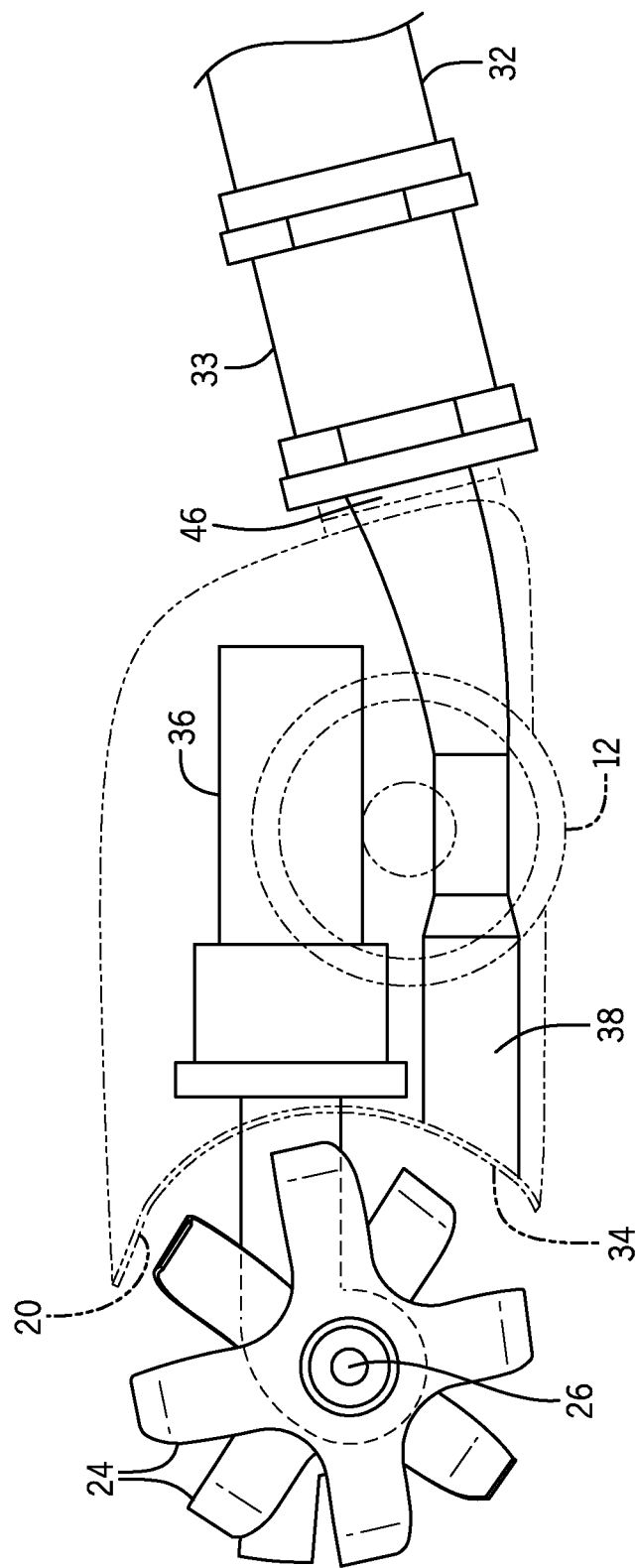
FIG. 4 depicts a side elevation view of certain embodiments of the dirt extraction apparatus with several parts removed for illustrative clarity.

Housing 14 is preferably made from plastic and comprises a top face, bottom face, front face, rear face and a pair of connecting side faces. Housing 14 comprises inlet 34 connected to outlet 46 by internal conduit 38, which extends from the housing's front face to the rear face. Housing 14 comprises sufficient space in the internal cavity to secure motor 36 therein as depicted in FIG. 4. In one embodiment, motor 36 is a 120 V AC electrical motor rated at ½ HP. However, the specifications of motor 36 may vary. Motor 36 is operably connected to drive mechanism 22, which is configured to rotate blades 24. In one embodiment, drive mechanism 22 comprises a gearbox, which controls the torque applied to the rotatable blades 24. Housing 14 comprises a plurality of vents 15 disposed on both side faces. Vents 15 enhance the flow of air in and out of housing 14 to prevent overheating of motor 36 when in use. A pair of wheels 12 is coupled to opposing side faces of housing 14 to improve maneuverability of dirt extraction apparatus 10 on the ground.

Housing 14 comprises top support handle 42 and side handles 18 to help a user to easily maneuver dirt extraction apparatus 10 when in use. Top support handle 42 is coupled to the top face of housing 14 and comprises generally C-shaped bar 16 and connecting bars 44 coupled together. In one embodiment, connecting bars 44 are oriented generally parallel to each other and generally perpendicular to the longitudinal axis of housing 14. In one embodiment, each connecting bar 44 comprises switch 40 electrically coupled to motor 36. Switches 40 can be depressed to enable and disable motor 36 as desired. Side handles 18 are coupled to opposing side faces of housing 14 and serve as secondary handles that help a user to maneuver dirt extraction apparatus 10. Each side handle 18 comprises a generally upright elongated bar.

Both top support handle 42 and side handles 18 are preferably made from metal such as stainless steel or other type of metal. In one embodiment, side handles 18 are covered by an outer layer made from a material such as rubber, plastic or other type of material. The outer layer enhances the user's grip when grasping side handles 18.

Blades 24 are coupled to shaft 26, which is rotatably mounted to drive mechanism 22. Blades 24 and shaft 26 are preferably made from steel. However, alternative materials may be used instead. The plurality of blades 24 is secured directly in front of inlet 34 of housing 14. In a preferred embodiment a pair of inner blades 24 and a pair of outer blades 24 are coupled to shaft 26 so that tines of each inner blade 24 and tines of a corresponding adjacent outer blade 24 are oriented in an alternating pattern. It shall be appreciated that any alternative number of blades 24 may be used in various configurations in alternative embodiments of the invention.

In one embodiment, the front face of housing 14 comprises deflector 20, which comprises a generally circular curvature that partially extends around the plurality of blades 24. Deflector 20 is designed to block flying dirt and/or debris ejected by rotating blades 24 from reaching the user who is situated behind dirt extraction apparatus 10. Deflector 20 may be made from plastic, metal or other suitable materials known in the field. In one embodiment, light 30 is coupled to the top of deflector 20 to illuminate the surrounding area. Light 30 is preferably a light emitting diode ("LED") flood light that can be enabled or disabled via a switch. However, alternative illuminating devices can be used instead.

The components of dirt extraction apparatus including light 30 and motor 36 are connected to a power source such as an electrical outlet or the like via electrical cord 28. In an alternative embodiment, dirt extraction apparatus 10 may be powered by alternative sources such as batteries. In an alternative embodiment, motor 36 may be gas-powered.

In operation, dirt extraction apparatus 10 is connected to the evacuator truck by output conduit 32. More specifically, the first end of output conduit 32 is connected to outlet 46 of housing 14 by conduit coupling 33, which may be a press-fit, snap-fit, or threaded coupling member. The second end of output conduit 32 is connected to an opening in the evacuator truck. In one embodiment, the evacuator truck comprises a trailer with a vacuum mounted thereon. The vacuum provides suction through output conduit 32 to a catch compartment mounted to the trailer.

Figure 2:
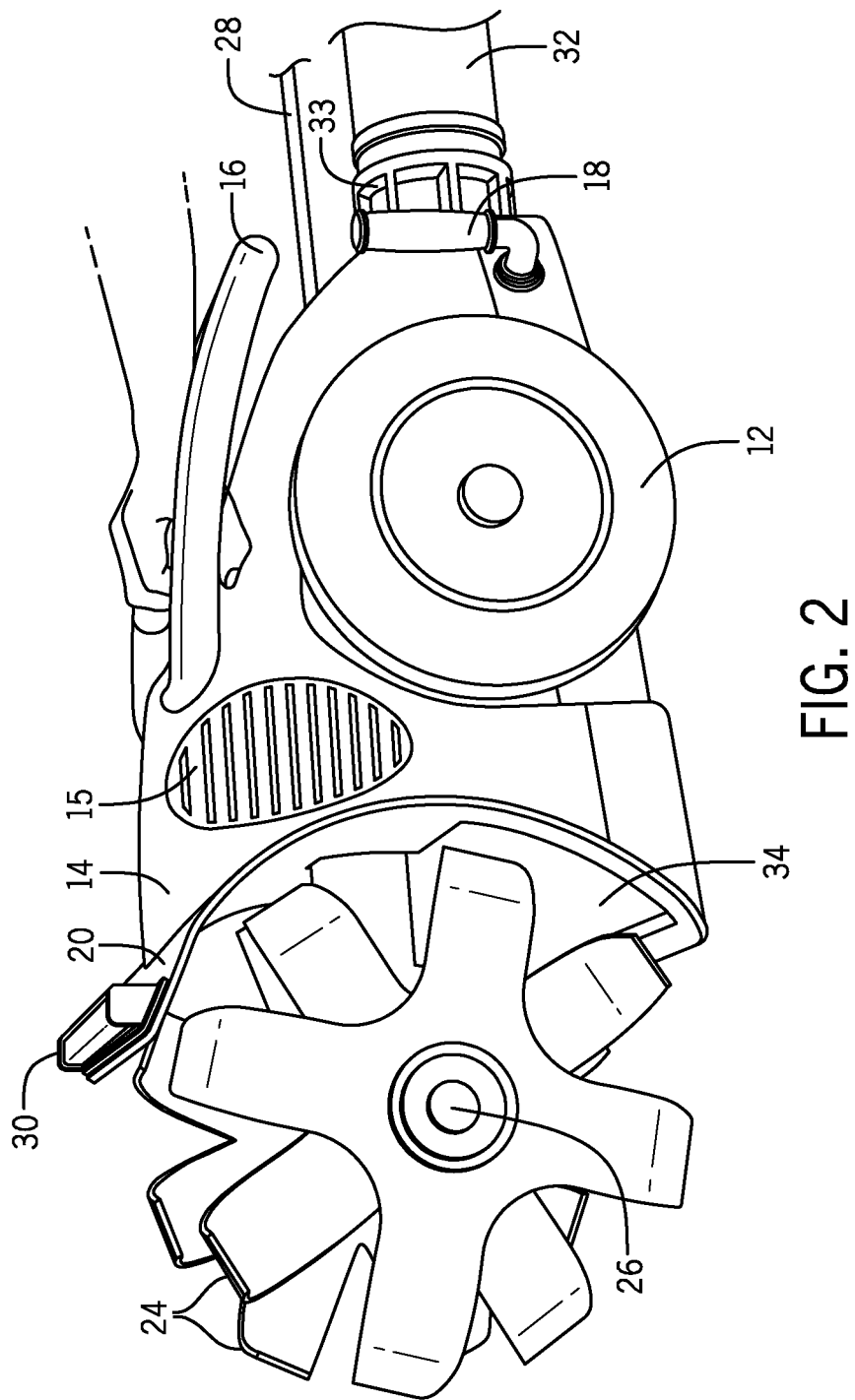
FIG. 2 depicts a side perspective view of certain embodiments of the dirt extraction apparatus.
Figure 3:
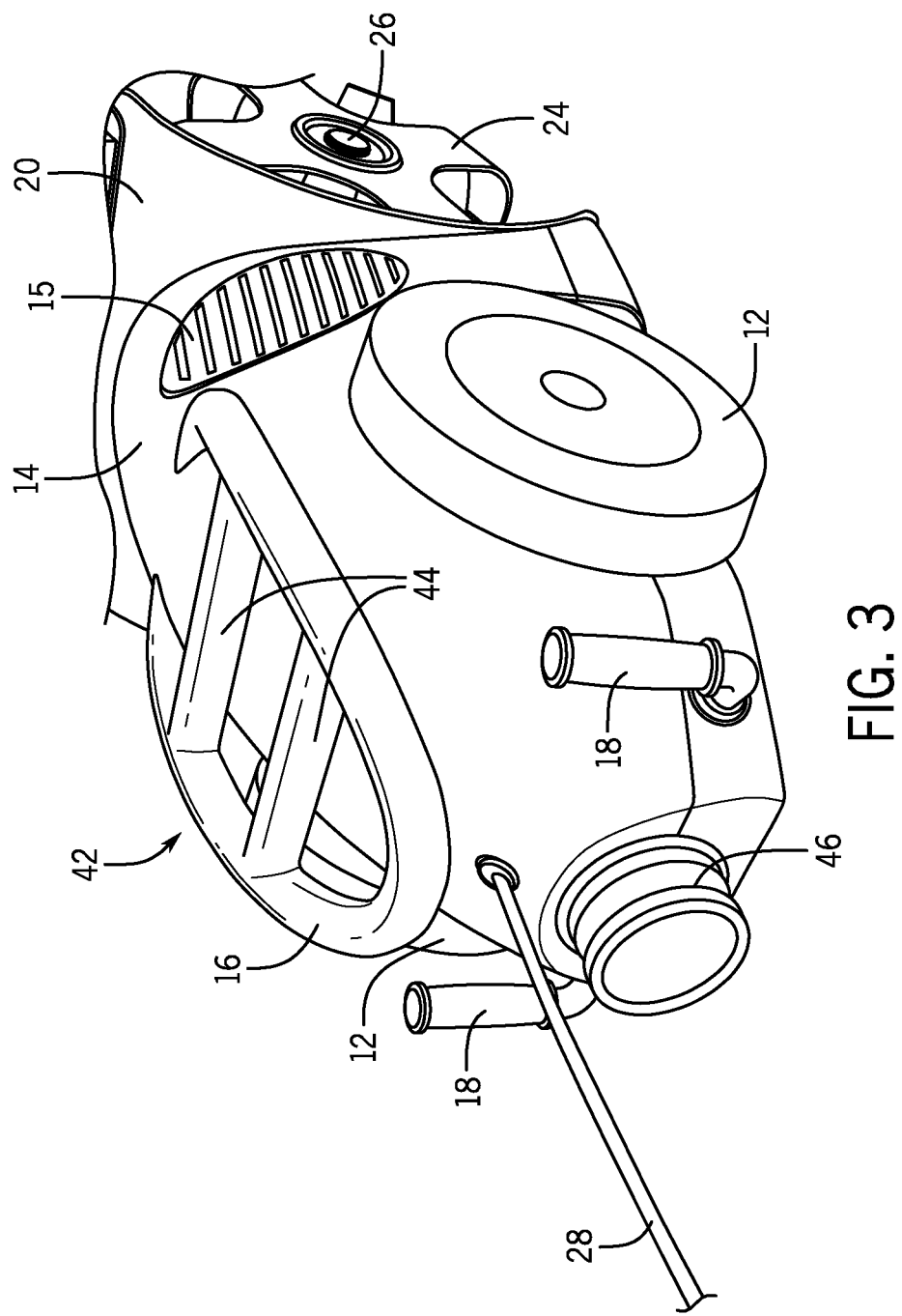
FIG. 3 depicts a front perspective view of certain embodiments of the dirt extraction apparatus.

The user generally lies on his/her stomach on the ground surface next to a building crawlspace. The user's hands grab any bar members in top support handle 42 and side handles 18 to maneuver dirt extraction apparatus 10. As depicted in FIG. 2, one hand is typically placed on top support handle 42. This allows the hand to be in position to depress switch 40 to enable or disable motor 36 as needed. The user can grab connecting bars 44 of top support handle 42 to maneuver dirt extraction apparatus 10 in and out of the building crawlspace. The user can grab side handles 18 to help steer housing 14 when pushing or pulling dirt extraction apparatus 10.

Once dirt extraction apparatus 10 is enabled, motor 36 permits drive mechanism 22 to rotate the plurality of blades 24. The rotation of blades 24 facilitates the movement of dirt and/or debris present in the building crawlspace's ground to enter inlet 34 of housing 14. Suction from the evacuator truck's vacuum generates sufficient force to evacuate the dirt and/or debris through internal conduit 38 of housing 14 to output conduit 32 for a disposal in the catch compartment on the trailer. As such, dirt extraction apparatus 10 provides the user with a cost-effective and efficient solution to effectively remove dirt and/or debris from the building crawlspace.

It shall be appreciated that the components of dirt extraction apparatus 10 described in several embodiments herein may comprise any alternative known materials in the field and be of any color, size and/or dimensions. It shall be appreciated that the components of dirt extraction apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A dirt extraction apparatus for use by a user to operate on a ground surface in a crawlspace of a building to extract dirt and debris with enhanced efficiency, the dirt extraction apparatus comprising:
   a housing comprising a front face, a rear face opposite the front face, a pair of side faces connecting the front and rear faces together, a top face coupled to the pair of side faces, and a bottom face opposite the top face and coupled to the pair of side faces, the housing comprising an internal conduit with an inlet on the front face and an outlet on the rear face;
   a plurality of blades rotatably mounted to the exterior of the housing proximate the inlet;
   a motor disposed within the housing and operably connected to the plurality of blades, the motor configured to drive the plurality of blades;
   a support handle coupled to the top face of the housing and comprising a plurality of bars coupled together; and
   a collection assembly coupled to the outlet of the housing;
   wherein any one of the plurality of bars of the support handle is configured to be grabbed by the user to maneuver the dirt extraction apparatus within the crawlspace of the building, thereby enabling the plurality of rotating blades to facilitate an evacuation of the dirt and debris from the ground surface through the internal conduit of the housing to the collection assembly.

2. The dirt extraction apparatus of claim 1, wherein the support handle comprises a generally C-shaped bar coupled to the housing and a pair of connecting bars coupled to the C-shaped bar.

3. The dirt extraction apparatus of claim 2, wherein each connecting bar in the pair of connecting bars of the support handle comprises a switch electrically coupled to the motor.

4. The dirt extraction apparatus of claim 3, further comprising a pair of generally upright secondary handles coupled to the pair of side faces of the housing.

5. The dirt extraction apparatus of claim 4, wherein the collection assembly comprises an output conduit comprising a first end coupled to the outlet of the housing and a second end coupled to an evacuator truck.

6. The dirt extraction apparatus of claim 5, further comprising a shaft coupled to the plurality of blades and operably connected to the motor by a drive mechanism.

7. The dirt extraction apparatus of claim 6, further comprising a deflector coupled to the front face of the housing, the deflector comprising a generally circular curvature that partially extends around the plurality of blades.

8. The dirt extraction apparatus of claim 7, further comprising a pair of wheels coupled to the pair of side faces of the housing and configured to contact the ground surface in the crawlspace.

9. The dirt extraction apparatus of claim 8, further comprising a plurality of vents coupled to the housing.

10. The dirt extraction apparatus of claim 9, further comprising an electrical cord comprising a first end electrically coupled to the motor and a second end coupled to a power source.

* * * * *